C. H. HACKETT & T. W. MORGAN.
CENTRIFUGAL CREAM SEPARATOR.
APPLICATION FILED DEC. 21, 1907.

907,144.

Patented Dec. 22, 1908.

2 SHEETS—SHEET 1.

WITNESSES:

INVENTORS
C. H. Hackett & T. W. Morgan,
BY
G. C. Kennedy,
ATTORNEY

C. H. HACKETT & T. W. MORGAN.
CENTRIFUGAL CREAM SEPARATOR.
APPLICATION FILED DEC. 21, 1907.

907,144.

Patented Dec. 22, 1908.

2 SHEETS—SHEET 2.

UNITED STATES PATENT OFFICE.

CHARLES H. HACKETT AND THOMAS W. MORGAN, OF WATERLOO, IOWA, ASSIGNORS TO WILBUR W. MARSH, OF WATERLOO, IOWA.

CENTRIFUGAL CREAM-SEPARATOR.

No. 907,144.      Specification of Letters Patent.      Patented Dec. 22, 1908.

Application filed December 21, 1907. Serial No. 407,466.

*To all whom it may concern:*

Be it known that we, CHARLES H. HACKETT and THOMAS W. MORGAN, citizens of the United States of America, and residents of Waterloo, Blackhawk county, Iowa, have invented certain new and useful Improvements in Centrifugal Cream-Separators, of which the following is a specification.

Our invention relates to improvements in centrifugal cream separators, and the object of our improvement is to improve that class of separators which have a rotatable bowl containing a liner composed of a series of superimposed separated hollow frusta, our specific improvement being the arrangement of such frusta into successive groups having several frusta each, the units of the group nearest the milk inlet opening being spaced more widely apart than the units of the other groups, and the units of each of the other groups being spaced a less distance apart than the units of the group immediately thereunder, it being the intention to thus provide wider interspaces at that end of the bowl containing the milk inlet than in the other portions of the cavity of the bowl approaching the milk exit, it being understood that the milk inlet and milk exit are respectively in opposite ends of the bowl, and this arrangement of parts being effective in affording more clearance space for the stripping of the cream from the full milk at the location where it first enters the bowl. This object we have accomplished by the means which are hereinafter described and claimed, and which are illustrated in the accompanying drawing, in which:—

Figure 1:
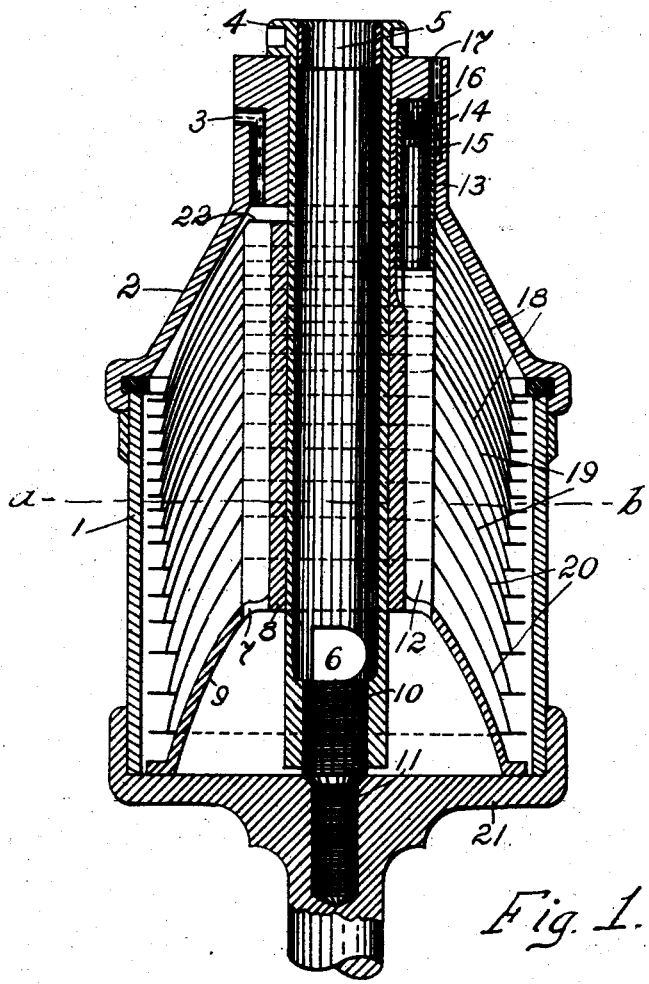
Figure 2:
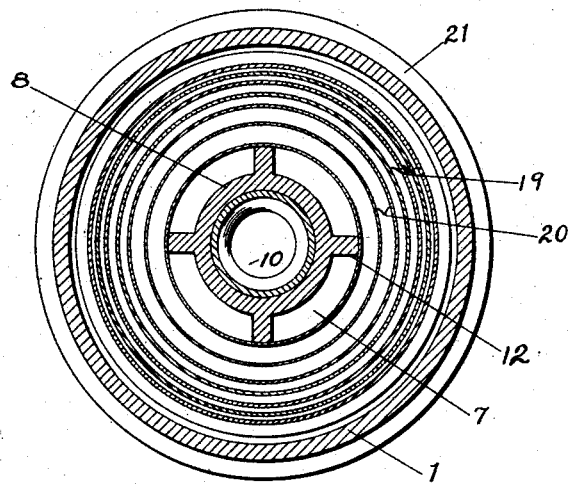

Figure 1 represents a central vertical axial section of a centrifugal cream separator bowl containing our improved lining device. Fig. 2 is a horizontal cross-section of the bowl and liner shown in Fig. 1, on the line *a—b.*

The rotatable bowl 1 has a cover 2 of the usual type, which is removably secured to the bowl by means of a hollow clamping-bolt 4, the hollow 5 of the latter serving as a channel for the entering milk which is sprayed into the interior of the bowl through an orifice 6 in the lower end of said bolt or inlet-tube. The lower end of said tube 4 has an interior thread to receive the threaded upper end 10 of a removable boss whose lower diminished member 11 may be screwed into a threaded opening in the bottom 21.

The numeral 8 designates a cylinder adapted to be seated about a portion of the tube 4, and has a hollow frustal expansion 9 contacting with the bottom 21 of the bowl. A plurality of spacing wings 12 project from the outside of this cylinder above its expansion 9, to a distance sufficient to support and space the frusta 18, 19, and 20 away from and concentric with the cylinder, leaving enough space between the inner edges of the frusta and the cylinder for the cream wall and the current of separating full milk which moves upward just outside of such cream wall.

Ports 7 are provided in the expansion 9 of sufficient width to allow of the entering milk to pass through into the interior of the bowl to move upward into the neutral zone of the liner.

The numeral 3 designates the milk exit in the cover 2, while a cream exit is provided in the cover at 17. The exit 17 communicates with a bored out hole 16 in communication with the interior of the bowl, and adapted to receive a cream-tube 13 whose lower end extends downward through the uppermost frustum 22 which has a closed top, and is fixed thereto, but is detachable from the cover 2. In the top of the tube 13 is a screw 14, which is adapted to cut off more or less of the slot 15 in said tube along its lower oblique edge, to vary the distance of the cream wall radially from the bowl's axis. The slot 15 is in communication with the channel 17 forming the cream exit.

The space in the bowl between the expansion 9 and the cover 2 outside of the cylinder and its wings 12 is filled with a series of superimposed separated hollow frusta. This vertical series is divided into a number of groups, each containing several frusta. The group of frusta 20, which lies nearest to the milk-delivery-opening 6 has its component units spaced comparatively widely apart. The next superimposed group has its units 19 spaced a lesser distance apart, while the topmost group has its units 18 spaced the least distance apart.

Milk discharged through the opening 6 below the expansion 9, tends to rise and pass out of the latter through the ports 7, and thence moves continuously upward portions being sprayed radially outward into the interspaces between the frusta 20, 19 and 18 respectively in succession, and finally the skimmed milk which has moved to the inner cylindrical surface of the bowl is voided through the exit 3, while the separated cream is expelled through the exit 17.

The particular object of arranging the frusta in groups, the interspaces between the units of each group differing in width from that of the others respectively, with a regular gradation of such spacing of the group units running from the widest spaces nearest the milk inlet to the narrowest spaces nearest the milk exit, is to afford a better clearance for the full milk at that portion of the bowl where it is as yet charged with a plethora of unseparated cream. In other words, where the full milk first passes between the frusta, as at 20, a larger clearance is required between them for the voiding toward the cream zone of the quickly separating larger proportion of cream. In the next group, such as 19, a large part of the cream being expelled below, the milk is lessened in volume, and narrower spaces are sufficient for its reception. Furthermore, it is desirable, in order to more thoroughly skim the remnant of unseparated cream from the milk, to adapt the liner so as to increase the number of baffling surfaces in a given cubic space of the bowl, and this is effected by increasing the number of frusta in an equal space as shown. These additional baffling surfaces aid in collecting the minuter globules of cream from the partially skimmed milk, and in returning them toward the cream zone. As many groups may be used as desired, each group consisting of two or more frusta, and the particular number of frusta in each group may be varied from that of the others, without changing the principle of our invention, which consists in the progressive narrowing of the interspaces between frusta by groups or in steps, in a direction leading from the milk inlet to the milk exit.

Having described our invention, what we claim as new, and desire to secure by Letters Patent, is:—

1. In a centrifugal cream separator, in combination, a rotatable bowl provided with a cream exit, a milk inlet at one end and a milk exit at the other end, and a liner composed of a series of superimposed separated hollow frusta, such series being divided into a plurality of groups each containing several frusta the interspaces between the frusta of the group nearest the milk inlet being of greatest height, and the interspaces between the frusta of the other groups lessening in height by groups progressively in a direction leading from said milk inlet toward said milk exit.

2. In a centrifugal cream separator, in combination, a rotatable bowl provided with a cream exit, a milk inlet at one end and a milk exit at the other end, an axial milk inlet tube extending through said bowl and opening at one end thereof, and a liner in said bowl spaced away from said inlet tube and composed of a series of superimposed separated hollow frusta, such series being divided into a plurality of groups each containing several frusta the interspaces between the frusta of the group nearest the milk inlet being of greatest height, and the interspaces between the frusta of the other groups lessening in height by groups in a direction leading from said milk inlet toward said milk exit.

3. In a centrifugal cream separator, in combination, a rotatable bowl provided with a cream exit, a milk inlet at one end and a milk exit at the other end of the bowl, an axial milk inlet tube extending through said bowl and opening at one end thereof, a cylinder about said tube having a perforated expanded lower end forming with the bottom of the bowl a chamber about the delivery opening in said tube, and a liner in said bowl above said expanded portion and spaced away from said cylinder composed of a series of superimposed separated hollow frusta, such series being divided into a plurality of groups each containing several frusta the interspaces between the frusta of the group nearest the milk inlet being of the greatest height, and the interspaces between the frusta of the other groups lessening in height by groups in a direction leading from said milk inlet toward said milk exit.

Signed at Waterloo, Iowa, this 2nd day of Dec. 1907.

CHARLES H. HACKETT.
THOMAS W. MORGAN.

Witnesses:
O. D. YOUNG,
G. C. KENNEDY.